(12) United States Patent
Rousseau

(10) Patent No.: US 8,449,810 B2
(45) Date of Patent: May 28, 2013

(54) MOLDING METHOD USING SHAPE MEMORY POLYMER

(75) Inventor: Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 12/884,310

(22) Filed: Sep. 17, 2010

(65) Prior Publication Data

US 2012/0068387 A1    Mar. 22, 2012

(51) Int. Cl.
*B29C 49/22* (2006.01)

(52) U.S. Cl.
USPC ........... 264/511; 264/553; 264/319; 264/320; 264/257

(58) Field of Classification Search
None
See application file for complete search history.

(56) References Cited

U.S. PATENT DOCUMENTS

| | | | |
|---|---|---|---|
| 7,622,069 B1 * | 11/2009 | Kia et al. | 264/314 |
| 7,727,450 B1 * | 6/2010 | Berger et al. | 264/266 |
| 2004/0018350 A1 | 1/2004 | Hilligoss | |
| 2006/0137424 A1 | 6/2006 | Browne et al. | |

FOREIGN PATENT DOCUMENTS

| | | |
|---|---|---|
| DE | 102009053115 A1 | 7/2010 |
| EP | 2075279 A1 | 7/2009 |

\* cited by examiner

*Primary Examiner* — Monica Huson
(74) *Attorney, Agent, or Firm* — Quinn Law Group, PLLC

(57) ABSTRACT

A method is provided for molding a composite part defined by using a preform comprising a shape memory polymer (SMP) binder. A bound preform comprising the SMP binder in a permanent shape and defined by a simplified geometry provided to a mold. The bound preform is heated above a transformation temperature of the SMP binder and deformed into a shaped preform defined by the temporary shape of the SMP binder. In a molding sequence, the shaped preform is constrained in its temporary shape by the mold while resin is introduced to the mold and cured to produce a final part. The shape of the cured part defines the temporary shape of the SMP binder. The bound preform may be generally configured as a mat or be defined by a substantially flat surface such that the preform may be used as a preform to mold a variety of differing part configurations.

20 Claims, 5 Drawing Sheets

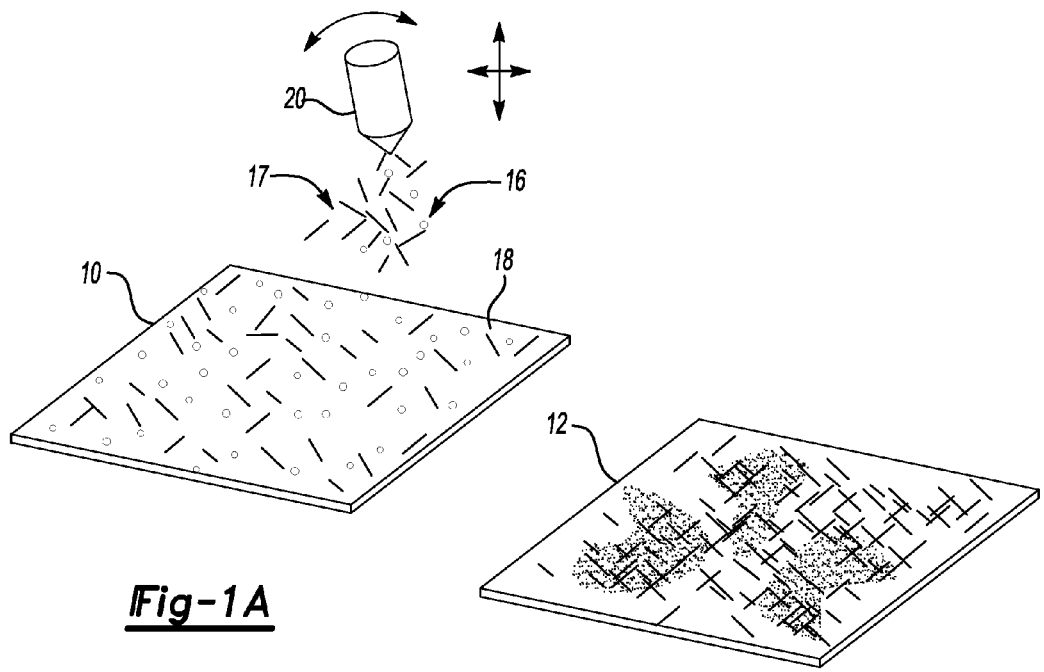
Fig-1A
Fig-1B
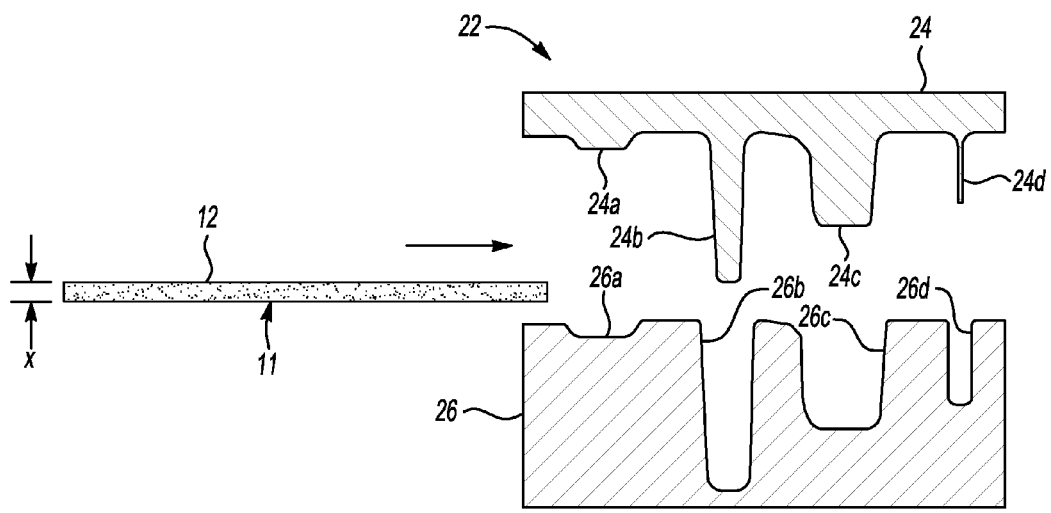
Fig-2A

MOLDING METHOD USING SHAPE MEMORY POLYMER

TECHNICAL FIELD

The present invention relates to a method of using a shape memory polymer binder for forming a preform and a molded polymer composite part.

BACKGROUND

Numerous techniques for molding require the use of preforms. Examples of molding techniques using preforms include composite, resin transfer, compression and injection molding. Using these techniques to mold parts with complex or intricate shapes and configurations is known to be challenging due to difficulty in precisely controlling the preform geometry and dimensions during fabrication of the preform. Challenges include attaining the desired thickness and distribution of preform fiber when spraying the preform material on the surface of a preform tool or mold, including difficulty in spraying the preform fiber to attain the desired thickness and distribution for intricate shapes and complex part features such as ribs and deep draw sections, and uniformly applying binder resin across these surfaces. Forming, handling and transporting preforms including complex part features and intricate shapes may require dedicated and costly preform tooling, customized dunnage such as pallets with integrated support for the intricate preform geometry, and specialized material handling equipment for conveying the preforms from the preform forming process and into the part molding process.

SUMMARY

A method is provided for molding a composite part from a bound preform initially configured in a simplified geometry such as a mat or sheet, which may define a predominantly flat surface. The bound preform is made from a material including a binder comprising a shape memory polymer (SMP). The bound preform, when configured in the simplified geometry, includes the SMP binder in a permanent shape, which allows for ease of manufacturing of the bound preform and insertion into a mold. After insertion into the mold, the bound preform is converted into a shaped preform by transforming the SMP binder into a temporary shape corresponding to the intricate features of the part to be molded, and the part is molded and cured such that the final shape of the cured part defines that of the shaped preform, which is alternatively that of the temporary shape of the SMP binder. The simplified geometry of the bound preform in the permanent shape provides advantages including lower cost of fabrication, improved uniformity in composition and mechanical properties, flexibility for use as a generic or universal preform for the fabrication of different parts of varying configurations, and efficiency in handling, storage and transportation of the bound preform due to the simplified geometry of its permanent shape. Converting the bound preform to a shaped preform defined by a temporary shape of the SMP binder corresponding to the molded or ultimate shape of the part prior to molding the part provides advantages including increased capability to form parts with complex shapes and intricate features having improved quality and dimensional control, at a reduced cost.

A method of molding a composite part characterized by a final part shape is provided. The method includes providing a bound preform comprising a shape memory polymer (SMP) binder and generally configured in a simplified geometry defined by a permanent shape of the SMP binder to a part mold that defines the final part shape, heating the bound preform above a transformation temperature of the SMP binder such that the bound preform is formable by the part mold, deforming the bound preform above a transformation temperature into a shaped preform defined by a temporary shape of the SMP binder, using the part mold. The bound preform may be deformed by one or more of stamping, compression and vacuum forming. The method further includes providing a resin to the shaped preform in the part mold, and curing the resin in the part mold to produce a part configured in the final part shape and comprised of the cured resin and the shaped preform. The temporary shape of the SMP binder is substantially defined by the final part shape, and the final part shape may define at least one intricate feature.

The method may further include forming the bound preform by spraying a material comprising the SMP binder to provide an unbound preform generally configured as a mat, heating the unbound preform above a binding temperature defined by the SMP binder, and converting the SMP binder to the permanent shape to bind the material, thereby converting the unbound preform into a bound preform, wherein the shape of the bound preform is defined by the shape of the unbound preform. The binding temperature may be defined by one of a cure temperature of a SMP binder comprised of a thermoset polymer, and a melting temperature of a SMP binder comprised of a thermoplastic polymer.

The preform material may comprise a fiber, the fiber including one or more of a glass fiber, a carbon fiber, a metallic fiber, a polymer fiber, a fiber comprising metal alloy wires, or a combination thereof. The preform material may be comprised of less than 10% SMP binder by weight, or selectively, less than 5% SMP binder by weight.

The unbound preform and the bound preform formed therefrom, in a simplified geometry, may be generally configured as one of a sheet, a panel and a mat. The unbound preform may be further defined by one or more substantially flat portions comprised of preform material of substantially uniform density, uniform thickness and uniform orientation, and one or more irregular portions. Each of the irregular portions may correspond to at least one of a mold portion, a preform tool portion, and a part feature, and may be defined by at least one of a non-uniform density, a non-uniform thickness, a non-uniform material orientation, and a corresponding preform tool portion.

Spraying the preform material comprising the SMP binder to provide the unbound preform may include uniformly spraying the material to provide substantially flat portions of substantially uniform density, thickness and material orientation; and selectively spraying the material to provide one or more irregular portions, wherein each irregular portion is defined by at least one of a non-uniform density, a non-uniform thickness and a non-uniform material orientation. The method may further include providing a preform tool including a tool portion corresponding to at least one of a portion of the part mold and a feature defined by the final part shape, and spraying the material on the preform tool to provide an unbound preform generally configured as a mat including an irregular portion defined by the tool portion which may be defined by at least one of a non-uniform density and a non-uniform thickness.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1A is schematic perspective view of an unbound preform comprising a shape memory polymer (SMP) binder;

FIG. 1B is a schematic perspective view of the preform of FIG. 1A bound into a permanent shape;

FIG. 2A is a schematic cross-sectional illustration of the bound preform of FIG. 1B and a mold;

DETAILED DESCRIPTION

Figure 2B:
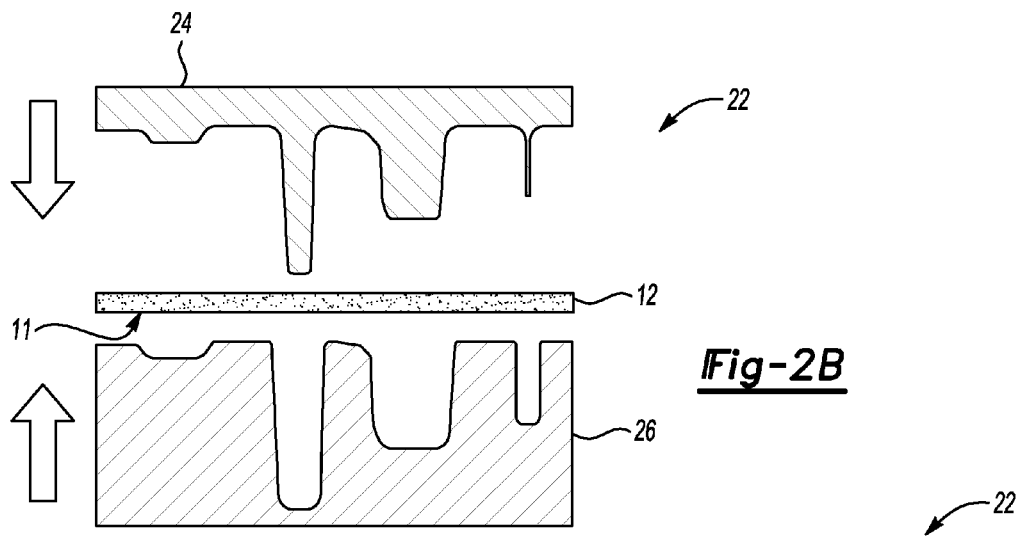
FIG. 2B is a schematic cross-sectional illustration of the bound preform of FIG. 1B and the mold of FIG. 2A in an open position.

Referring to the drawings wherein like reference numbers represent like components throughout the several figures, it is understood that the elements shown in FIGS. 1A through 4D are not to scale. Accordingly, the particular dimensions and applications provided in the drawings presented herein are not to be considered limiting. A method is provided for molding a composite part defined by one or more complex shapes and/or intricate features using a preform comprising a shape memory polymer (SMP) binder, where the preform in its permanent shape is configured in a simplified geometry. In a non-limiting example, the preform in a permanent shape may be configured as a mat, panel or sheet which may be further defined by a predominantly flat surface.

FIG. 1A shows an unbound preform 10 being formed by spraying a material 18 including a binder 16 comprised of shape memory polymer, also referred to as a SMP binder, using a sprayer 20. The unbound preform 10 in the non-limiting example shown in FIG. 1A is generally configured in a simplified geometry as a mat 10 which may be defined by one or more predominantly flat surfaces 11 (see FIG. 2A), as that term is described herein.

As used herein, the terms "unbound" and "unset" refer to the condition of the preform prior to heating the preform material 18 including the SMP binder 16 above a temperature referred to as the "binding temperature" or the "setting temperature," at which the SMP binder 16 will melt and flow then crosslink to bind and set the unbound preform 10 to form a bound preform 12 where the shape of the bound preform 12 is defined by the permanent shape of the SMP binder 16. The terms "bound" and "set" refer to the condition of the preform 12 after the preform has been heated above the binding temperature such that the preform has been "bound" or "set" to its permanent shape.

The SMP may be a thermoset polymer, such as an epoxy, that is set by heating the preform to a curing temperature which is characteristic of, e.g., specific to, the thermoset SMP comprising the SMP binder 16, at which temperature the SMP binder particles melt and flow, then covalently crosslink to set the thermoset SMP in a permanent shape. According, the binding temperature of a SMP binder 16 comprised of a thermoset polymer corresponds with, e.g., is determined by, a curing temperature defined by or characteristic of that thermoset polymer.

The SMP may be a thermoplastic polymer that is set by heating the preform to a melting temperature which is characteristic of, e.g., specific to, the thermoplastic SMP comprising the SMP binder 16, at which temperature the SMP binder particles melt and flow, then physically crosslink to set the thermoplastic SMP in a permanent shape. Accordingly, the binding temperature of a SMP binder 16 comprised of a thermoplastic polymer corresponds with, e.g., is determined by, a melting temperature defined by or characteristic of that thermoplastic polymer.

The material 18 further comprises a fiber and/or filler 17, which may be a reinforcing, strand and/or chopped strand fiber. Non-limiting examples of suitable fibers/fillers 17 may include glass fibers, metallic fibers, carbon fibers, polymer fibers including high molecular weight polyethylene fibers, liquid crystalline polyester fibers, etc., thin metal alloy or metallic wires, and/or the like, and/or combinations thereof.

The sprayer 20 may be configured to chop the fiber 17 and/or mix the fiber 17 and binder 16 in predetermined proportions. Alternatively, the sprayer 20 may be configured to alternately or consecutively spray the fiber 17 and the SMP binder 16 in a defined sequence. By way of another non-limiting example, the sprayer 20 may be configured to spray the SMP binder 16 onto a non-woven mat provided to the sprayer 20, to produce an unbound mat 10 comprised of the non-woven mat and the SMP binder 16. The non-woven mat may be comprised, for example, of unwoven glass or carbon.

In a non-limiting example, the SMP binder 16 may be less than 10% by weight of the unbound preform 10, and the fiber 17 may be at least 90% by weight. Selectively, the SMP binder 16 may be less than 5% by weight of the unbound preform 10. It is understood that with the low percentage by weight of the SMP binder 16 in the material 18, some shape memory properties, such as shape recovery, may not be optimized in the final cured part. The relatively low percentage of SMP binder 16 is utilized, as described in detail herein, to enable a change in the modulus of the preform above and below the transformation temperature of the SMP binder 16, to enable conversion of a bound preform from a permanent shape defined by a simplified geometry (see 12, 32, 42 in FIGS. 2B, 3B, 4B, respectively) by shaping the preform above the transformation temperature of the SMP binder 16 into a temporary shape (see 13 in FIG. 2C) defined by one or more intricate features (see 13a-13d in FIG. 2C, for example), prior to providing a molding resin to the shaped preform 13 and curing the composite part formed therefrom into a final or ultimate part 14 (see FIG. 2D). Additionally, because the temporary shape of the shaped preform can be maintained with highly controlled dimensional accuracy, depending on the SMP characteristics of the particular SMP in use, the shaped preform formed therefrom will exhibit high dimensional stability and accuracy.

The sprayer 20, which may also be referred to as a spray gun or gun, may be hand-held or operatively connected to a fixture or mechanism such that sprayer 20 is configurable to be positioned and moved manually or automatically so as to deposit the material 18 in a spraying pattern to form the unbound preform 10. The spraying pattern of sprayer 20 and the resultant thickness, profile, orientation, density and other characteristics of the material 18 of the unbound preform 10 may be varied by varying the flow rate of material 18 sprayed by sprayer 20, the relative position of the sprayer 20 with respect to the unbound preform 10 including distance and/or angular orientation from the unbound preform 10 or the surface of the preform tool (see FIGS. 3A, 4A, for example), the profile of the preform tool, the spraying path or other spraying process characteristics as would be understood. The preform tool, as used herein, refers to the substrate, surface or preform mold or tool upon which the material 18 may be sprayed or deposited to form the unbound preform 10, and may, by non-limiting example, be configured as a screen or other perforated or non-perforated framework, a conveyor, belt, mandrel or mold surface or cavity. The preform tool may be generally flat or predominantly flat or may be profiled or detailed to define the shape of the preform. It would be understood that the preform tool may be a conveyor, a moving belt or other configuration able to produce a continuous mat, sheet or fabric which may be subsequently cut or slit to provide the preform. The preform screen or tool may be adaptable to, for example, a vacuum forming system configurable to hold or retain the material 18 against or on the surface of the preform screen or tool prior to binding or setting the unbound preform 10.

As used herein, the phrase "to spray," or any other suitable variation refers to spraying (or otherwise establishing) the material 18 onto a surface in a controlled manner, wherein the surface may be a standardized surface such as a screen, conveyor, or other generally flat surface, or a surface defining a profile, such as the surface of a screen or tool configured to define the shape of an unbound preform 10. In some instances, spraying is controlled to achieve uniformity in at least one of thickness, area, density or orientation of the material as deposited, and is referred to herein as "uniformly spraying." The area or portion of the unbound preform 10 produced by "uniformly" spraying may be referred to as a "uniform portion," "uniform area" or may be defined by a "uniform" density, height, thickness, area or orientation.

In other instances, spraying is controlled so that the resulting layer or area may not be substantially uniform (i.e., may be non-uniform or irregular) in at least one of thickness, area, density or orientation (i.e., the thickness, area, density and/or orientation of the material along a section or in a portion or area of the unbound preform 10 or a layer of the unbound preform 10 varies so as to be "non-uniform" or "irregular" with respect to the "uniform" portion or area), and is referred to herein as "selectively spraying" to produce the "non-uniform" or "irregular" area, portion or layer.

The unbound preform 10 may be generally configured, as shown in the non-limiting example of FIG. 1A, in a simplified geometry such as a mat, panel, sheet, fabric or other configuration which may define a predominantly flat surface 11, as that term is defined herein. (See FIGS. 2A, 3B, 4B) The unbound preform 10 is converted to and defines the shape of a bound preform 12 shown in FIGS. 1B and 2A, where the bound preform 12 comprises SMP binder 16 in a permanent shape. The bound preform 12 may also be referred to as the preform 12 in a permanent shape. The preform 12, in a simplified geometry such as a mat, may have a thickness or height x as shown in FIG. 2A.

The unbound preform 10 is converted to a bound preform 12 in a permanent shape by heating the unbound preform 10 comprising the SMP binder 16 to the binding temperature of the SMP binder 16, for a sufficient time to bind the SMP binder 16 and the fiber 17 together and to set the SMP binder 16 into its permanent shape. The binding temperature or setting temperature will be characteristic of the particular SMP binder 16 used to form the unbound preform 10, and will vary depending on the type of SMP binder 16 selected. Non-limiting examples of suitable shape memory polymers include epoxy-based systems, acrylate-based systems, styrene-based systems, olefin-based systems, polyurethane-based systems, or combinations thereof.

As shown in FIG. 2A, the simplified geometry of the bound preform 12 allows for ease of manufacturing of the bound preform 12 and ease of insertion into a mold 22. The simplified geometry of the bound preform 12 in its permanent shape provides advantages including lower cost of fabrication, improved uniformity in composition and mechanical properties due to uniformity of the preform spraying process while forming the unbound preform 10, flexibility for use as a generic or universal preform for the fabrication of different parts of varying configurations, and efficiency in handling, storage and transportation of the bound preform 12 due to the simplified geometry.

The term "simplified geometry" refers to the permanent shape of the bound preform 12, which is characterized by a configuration or profile which is substantially less intricate or complex than the temporary shape of the shaped preform 13 or the ultimate shape of the cured part 14 defining the temporary shape of the shaped preform 13. By way of non-limiting example, the bound preform 12 in its permanent shape shown in FIG. 2B defines a "simplified geometry" as compared with the complex shape of the shaped preform 13 shown in its temporary shape in FIG. 2C and as compared with the final part 14 cured using the shaped preform 13 in its temporary shape. The geometry of the bound preform 12 is "simplified" as compared with the intricate features defining the shaped preform 13 and the cured part 14, since the predominantly flat profile characterizing bound preform 12 does not include or define, for example, the intricate features 13a-13d and 14a-14d of the shaped preform 13 and the cured part 14, respectively. Due to its "simplified geometry," the bound preform 12 may be formed as a continuous sheet or mat and handled, stored and transported, for example, on rolls, which may also be used to continuously feed the continuous mat preform into mold 22, or which may be slit or cut into stackable sheets for insertion into the mold 22.

Figure 3A:
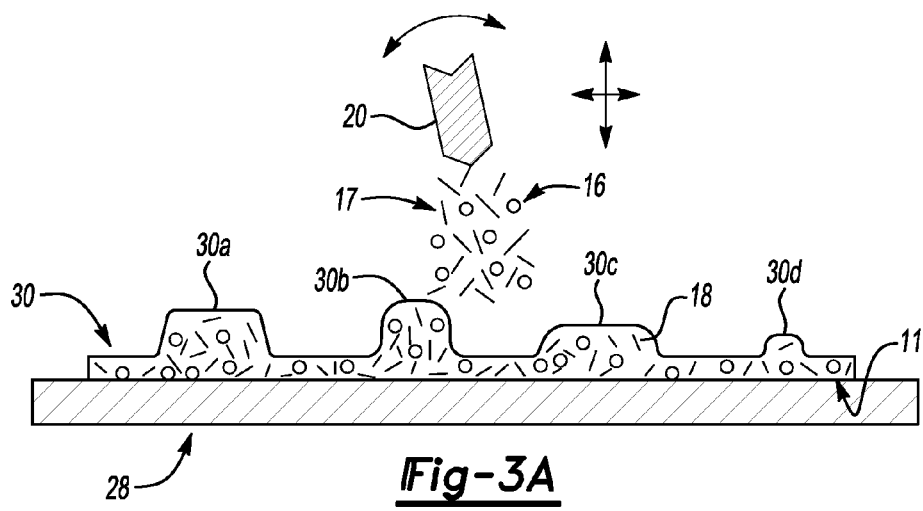
FIG. 3A is a schematic cross-sectional illustration of an unbound preform comprising a SMP binder and defining an irregular portion, and a preform tool.
Figure 3B:
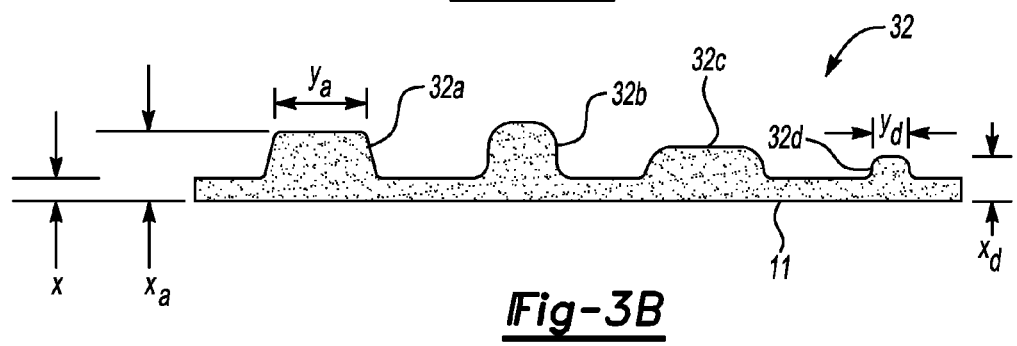
FIG. 3B is a cross-sectional illustration of the preform of FIG. 3A bound into a permanent shape.
Figure 4A:
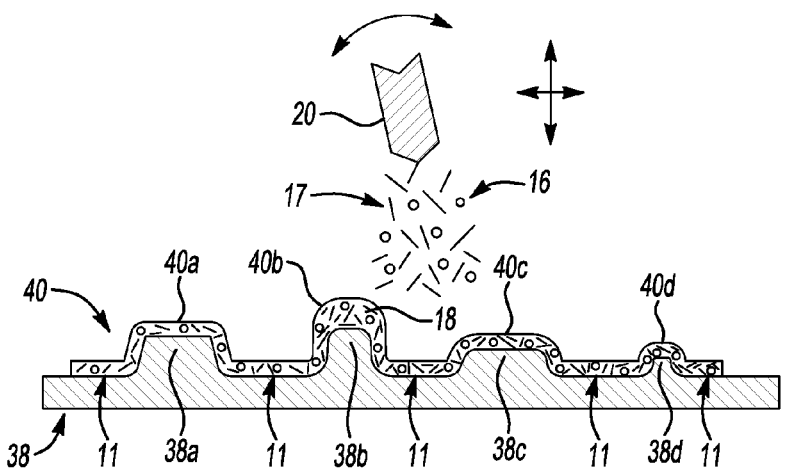
FIG. 4A is a schematic cross-sectional illustration of an unbound preform comprising a SMP binder and defining an irregular portion, and a preform tool defining the irregular portion.
Figure 4B:
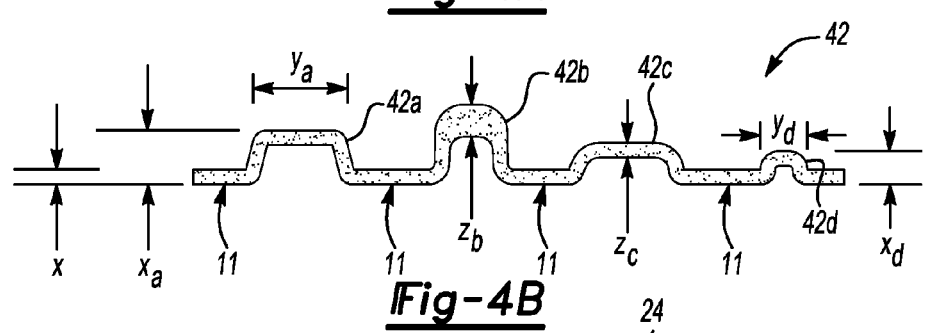
FIG. 4B is a schematic cross-sectional illustration of the preform of FIG. 4A bound into a permanent shape.

In other non-limiting examples, the bound preforms 32 and 42 in their respective permanent shapes shown in FIGS. 3B and 4B, respectively, define a "simplified geometry" as compared with the shaped preform 13 and the cured part 14, wherein, for example, the irregular portions 32b and 32c of the bound preform 32 and the irregular portions 42b and 42c of the bound preform 42 are of substantially reduced elevation, in this instance, significantly lesser height, than their corresponding features 13b and 13c of the shaped preform 13 and features 14b and 14c of the cured part 14. As such, the bound preforms 32 and 42 may be more easily formed in their respective unbound shapes 30 and 40, and may be defined by more uniform properties and characteristics, than would be, for example, the more complex shape of the shaped preform 13. Further, the bound preforms 32 and 42 each define a predominantly flat surface 11 which may be used to transport the bound preforms 32 and 42 by pallet or conveyor, and which may facilitate stacking of multiple bound preforms 32 and 42 with minimal distortion thereof. In contrast, handling, storage and transportation of the shaped preform 13, with its complex shape, may require the use of customized pallets or trays to avoid damage and distortion of the intricate features 13a-13d. The reduced elevation of the profiles of the bound preforms 32 and 42 provide for ease of insertion into the mold 22, and may also assist in the placement and alignment of the preform portions with their corresponding mold portions.

Accordingly, a "simplified geometry" is defined by comparison to the final part shape, and may be defined by a generally flat surface or portion, a predominantly flat surface or portion, a profile, portion or feature which may be a modification or derivation of an intricate part feature such that the bound preform feature is substantially or significantly less intricate or complex than the corresponding final part feature, wherein "substantially or significantly less intricate" is relative to the ease or ability to control spraying quality and uniformity and to form, transport, store, or handle the bound preform (12, 32, 42, for example) defined by its simplified geometry, in comparison to the ease or ability to control spraying quality and uniformity and to form, transport, store or handle the shaped preform 13 defined by its intricate features (13a-13d, for example). Additional examples of "simplified geometry" include modified draft angles or radii, decreased heights or depths, reduced elevations, less complex profiles, etc.

The simplified geometry of the bound preform 12 may include a predominantly flat surface 11, as shown in non-limiting examples, in FIGS. 2A, 3A, 3B, 4A and 4B. A "predominantly flat surface" as used herein, is defined as a surface wherein the substantially flat areas, which could also be referred to as substantially co-planar areas, substantially flat portions, or generally flat areas or portions, of the predominantly flat surface constitutes more than 50% of the surface area of the predominantly flat surface. An area or portion which is "substantially" or "generally" flat as described herein defines a surface area or surface portion which is greater than 80% flat across its area or portion. By way of illustration, the predominantly flat surface 11 of the bound preform 12, 32, shown in FIGS. 2A, 3B respectively, may also be described as a generally flat surface 11. The bound preform 42 shown in FIG. 4B includes a predominantly flat surface 11, wherein the predominantly flat surface 11 constitutes a series of generally flat portions or areas defining more than 50% of the predominantly flat surface 11. Further, a "predominantly flat surface" is characterized by the ability to be transported readily by positioning the preform with its predominantly flat surface on a pallet, rack, conveyor or other generally flat surface, or to be generally stackable on this surface for the purpose of transporting the bound preform 12 (32, 42). Because of the simplified geometry of the bound preform 12, 32, 42, standard dunnage such as flat pallets, racks and conveyors may be used for transport of the bound preform 12, 32, 42 to the mold 22, and distortion or damage of the bound preform during transport and handling may be reduced.

As shown in FIGS. 2A and 2B, the bound preform 12 is inserted into a mold 22 which may be configured to include a first mold element 24 and a second mold element 26, which together define a mold cavity of mold 22, wherein the mold cavity is configured to define the cured shape of a final part 14 (see FIG. 2D) produced by providing a molding resin to the shaped preform 13 in the mold 22, and subsequently curing the part 14. The shape of part 14, as produced by mold 22, may be referred to as the cured shape, the molded shape, the ultimate shape, the finished shape, or the final shape of part 14.

Figure 2C:
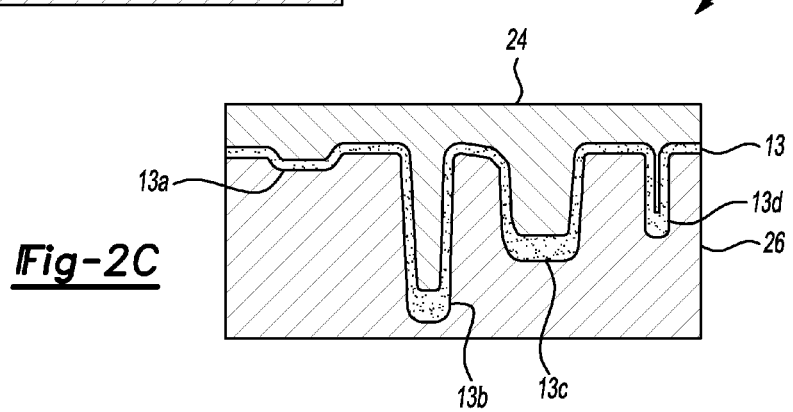
FIG. 2C is schematic cross-sectional illustration of the shaped preform in a temporary shape in the mold of FIG. 2A in a closed position.

In FIG. 2C, the bound preform 12 in the mold 22 is heated to a temperature above the transformation temperature of the SMP binder 16 and below the degradation temperature or melting temperature of the SMP binder 16. The mold 22 is closed or otherwise configured to subject the bound preform 12 to pressure while the bound preform 12 is at a temperature above its transformation temperature such that the SMP binder 16 is converted into its temporary shape which is the shape of the shaped preform 13 and is defined by the mold cavity of the mold 22 including the intricate features defined by the mold 22. As used herein, the term "transformation temperature" of the SMP binder 16 refers to the temperature at which the SMP binder 16 becomes easily deformable such that the bound preform 12 is easily converted from its permanent shape into its temporary shape, e.g., the shape of the shaped preform 13 defined by the mold cavity of the mold 22.

After the shaped preform 13 is converted to its temporary shape, e.g., after deforming the preform 12 at a temperature above the transformation temperature to form the shaped preform 13, a molding resin is introduced to the mold cavity of the mold 22 containing the shaped preform 13 to produce a composite comprised of the uncured molding resin and the shaped preform 13. The molding resin may contain additives such as ultra-violet stabilizers, dyes, internal release agents, particulate additives/fillers, heat stabilizers, etc. The composite is cured at a curing temperature defined by the molding resin to form a final or cured part 14. The curing temperature, as used herein, is a temperature which is below the preform degradation temperature. The preform degradation temperature is defined by the lowest degradation temperature of any of the components of the preform, including the SMP polymer binder 16 and the fiber 17.

The cured part 14 may be molded using any of the commonly understood methods of composite molding, where molding the composite part generally includes injecting a molding resin into a closed mold containing a shaped preform, thereafter adjusting the temperature to the curing temperature of the molding resin, and curing the molding resin prior to opening the mold to release the cured, final part. For example, part 14 may be molded using one of a composite, resin transfer, compression or injection molding technique or method. Similarly, any mold configuration suitable for use with a molding technique using a preform may be utilized. The mold configuration is not limited, for example, to a two piece mold such as mold 22 shown in FIG. 2A, and other mold types and configurations may be used with the methods described herein.

Figure 2D:
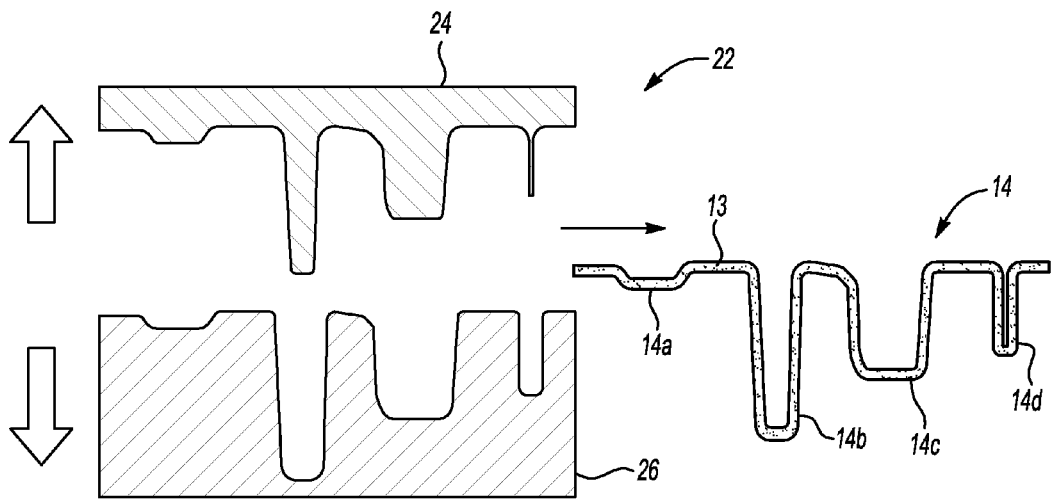
FIG. 2D is a schematic cross-sectional illustration the mold of FIG. 2A in an open position, and of a cured part comprising the shaped preform of FIG. 2C.

After the part 14 is cured in the mold 22, the cured part 14, in its ultimate or final molded shape, is removed from the mold 22, as shown in FIG. 2D. The cured part 14 includes one or more intricate part features 14a, 14b, 14c, 14d, which may be of varying shape and geometry not limited to the example configurations shown in FIG. 2D. A part feature may also be referred to as or define an "intricate feature" or an "intricate part feature," which as used herein, refers to a portion or feature of a part having a complex shape or geometry. Features having a "complex shape" or a "complex geometry," as the terms are used herein, generally have a shape or geometry that renders the portion/feature difficult to form or dimensionally control using conventional preforming and molding processes. Such shapes or geometries include, for example, ribs, crevices, peaks, valleys, protrusions and extensions having narrow and steep draws, deep draw sections, steep draft angles, inconsistent or variable cross-sections or relatively small dimensions or fine details which are difficult to uniformly spray with a material 18 to form a preform defining one or more of these complex shapes, features or geometries. Therefore, using such a non-uniformly sprayed preform to mold a part may produce molded parts characterized by uncontrollable or highly variable thickness, dimensions, and/or surface properties, e.g., apparent fibers at the surface of the final part.

Each of the final part features 14a, 14b, 14c, 14d, corresponds to one or more mold portions which define, correspond to, and/or are used to form the molded and cured features. For example, and referring to FIGS. 2A and 2D, part feature 14a of part 14 corresponds to mold portions 24a and 26a, such that when mold elements 24 and 26 are closed to define a mold cavity of mold 22, mold portions 24a and 26a correspond to and cooperate to define and form part feature 14a. Similarly, mold portions 24b and 26b correspond to and cooperate to define and form part feature 14b, mold portions 24c and 26c correspond to and cooperate to define and form part feature 14c, and mold portions 24d and 26d correspond to and cooperate to define and form part feature 14d.

As shown in FIGS. 2B and 2C, the bound preform 12 is inserted into the mold 22, and the mold 22 is closed by the relative movement of the first and second mold elements 24, 26 in the direction of the arrows shown in FIG. 2B. As shown in FIG. 2C, after insertion into the mold 22 the bound preform 12 is converted to a shaped preform 13 in a temporary shape by heating the bound preform 12 in the mold 22 above the transformation temperature of the SMP binder 16, and applying pressure such that the SMP binder 16 in the preform, and thereby, the preform itself, deforms such that the preform conforms to the cavity of the mold 22 to form the shaped preform 13.

The temporary shape of the shaped preform 13 may be "fixed" by subsequent cooling below the transformation temperature of the SMP binder 16 such that the bound preform 12 is converted to its temporary shape shown by the shaped preform 13 in FIG. 2C. It should be noted, however, that cooling below the transformation temperature is not a necessary or essential step since the shaped preform 13 in its temporary shape has become spatially constrained within the mold cavity of the closed mold 22, thereby prohibiting the shaped preform 13 from reverting to its permanent shape defined by the bound preform 12. Pressure may be applied to the heated preform to convert the heated preform and the SMP binder 16 therein to the shaped preform 13 comprising the SMP binder 16 in its temporary shape by compression, vacuum molding, stamping, air pressure, or any other suitable means to apply pressure within mold 22 while the preform is heated above the transformation temperature of the SMP binder 16.

In the non-limiting example shown in FIG. 2C, the shaped preform 13 in its temporary shape is defined by shaped preform features 13a, 13b, 13c, 13d which correspond to the part features 14a, 14b, 14c, 14d of the cured part 14, respectively, such that the shaped preform 13 in the temporary shape is defined by the mold cavity of mold 22 and after curing, by the final shape of the cured part 14. As shown in FIG. 2D, the final part 14 which is removed from mold 22 exhibits substantially the same shape as the temporary shape of the SMP binder 16 defining the shape of the shaped preform 13. Converting the bound preform 12 to a shaped preform 13 in a temporary shape corresponding to the cured or ultimate shape of the part 14 prior to molding and curing the part 14 provides advantages including increased capability to form parts with complex shapes and intricate features having improved quality and increased dimensional control.

FIG. 3A shows an alternate configuration of an unbound preform 30, where the unbound preform 30 is formed by uniformly spraying the material 18 on a generally flat surface, which may be a generally flat surface of a preform tool 28, to form a predominantly flat surface 11, and selectively spraying the material 18 to form irregular areas or portions 30a, 30b, 30c, and 30d, which, as shown in the non-limiting example of FIG. 3A, are of greater height or thickness than the uniformly sprayed layer. The irregular portions 30a, 30b, 30c, 30d may be of non-uniform density or orientation, as compared with the uniform portions. The unbound preform 30 defines the shape of the bound preform 32 and the corresponding irregular portions 32a, 32b, 32c and 32d shown in FIG. 3B.

The bound preform 32, as discussed previously, is produced by heating the unbound preform 30 above the binding temperature of the SMP binder 16 used to form the unbound preform 30, to bind the preform into its permanent shape such that the unbound preform 30 defines the shape of the bound preform 32. As shown in FIG. 3B, the irregular portions 32a, 32b, 32c, 32d may be non-uniform with respect to each other, e.g., irregular portion 32a may have a greater height $x_a$ and width $y_a$ than irregular portion 32d, where irregular portion 32d is defined by a height $x_d$ and width $y_d$, in a non-limiting example. Each irregular portion may vary from another irregular portion and may vary from the substantially flat portions of the bound preform 32 in one or more characteristics which can be varied by the spraying pattern used to form the unbound preform 30, including but not limited to thickness, area, density, height and orientation of the material 18. The low profile and simplified geometry of the bound preform 32 in its permanent shape, in comparison with the intricate geometry and more varied profile of the shaped preform 13 in its temporary shape, demonstrate the advantage of easier material handling, including the ability to transport the bound preform 32 on flat surfaces such as conveyors or pallets, and ease of insertion of the bound preform 32 into the mold 22 for subsequent forming into the shaped preform 13 and the cured part 14.

Figure 3C:
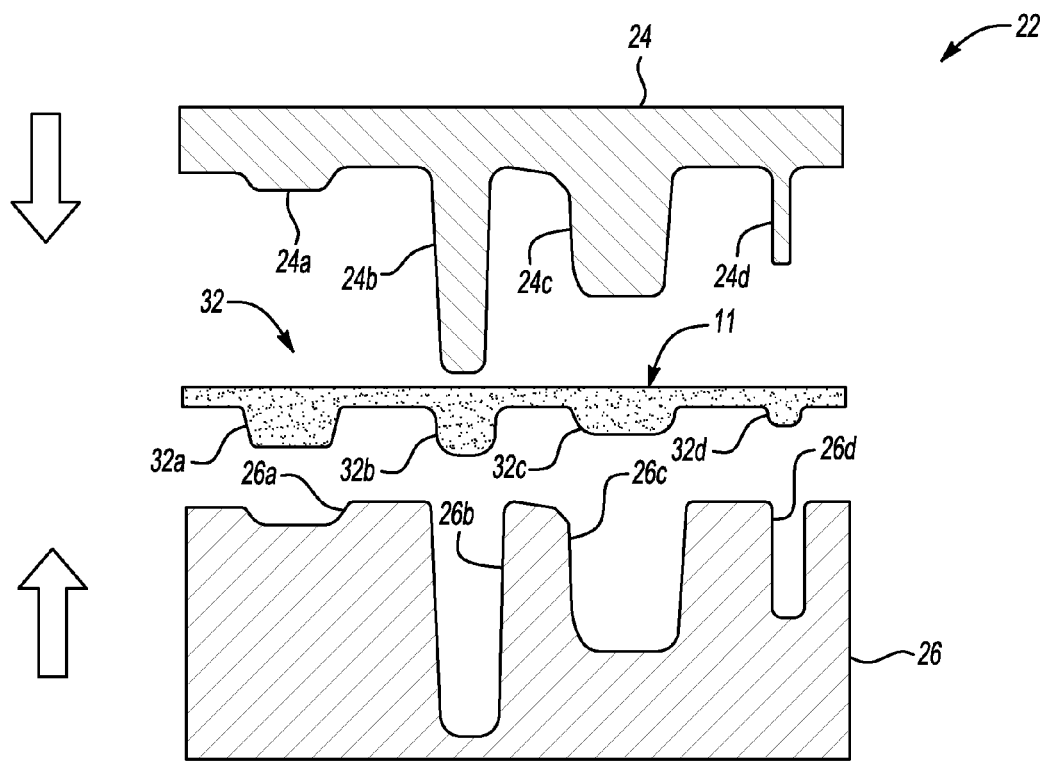
FIG. 3C is a schematic cross-sectional illustration of the mold of FIG. 2A in an open position, and of the bound preform of FIG. 3B.

As shown in FIG. 3C, one or more of the irregular portions 32a, 32b, 32c, 32d may correspond to a portion of the mold 22, or represent a simplified geometry of corresponding features of the ultimate part 14 produced by the mold 22. For example, as shown in FIG. 3C, where the bound preform 32 in the permanent shape has been inserted into the mold 22, the irregular portions 32a, 32b, 32c and 32d correspond with the mold portions 26a, 26b, 26c and 26d of the mold element 26, respectively. When the bound preform 32 is heated above the transformation temperature of the SMP binder 16 the bound preform 32 becomes deformable, such that when the mold 22 is closed or otherwise configured to exert pressure on the bound preform 32, the preform is deformed to conform to the cavity of the mold 22.

The additional preform material 18 provided by the irregular portions of the bound preform 32 may be selectively distributed on the mold features or portions 26a, 26b, 26c and 26d as the bound preform 32 is deformed and shaped into its temporary shape shown as the shaped preform 13 in FIG. 2C. The additional preform material 18 provided by the irregular portions of the preform thereby improves the formability of the intricate features 13a, 13b, 13c and 13d of the shaped preform 13 in the mold 22. For example, the additional material 18 provided by the irregular portion 32b, when heated above the transformation temperature and extruded by the mold portion 24b into the mold portion 26b may provide supplementary material, in comparison with a generally flat preform, that may be selectively drawn to form the preform feature 13b (see FIG. 2C) with sufficient thickness and quality.

Following conversion of the bound preform 32 to the shaped preform 13 in its temporary shape shown in FIG. 2C, the molding and curing process continues as discussed previously for FIGS. 2C and 2D, with, for example, the introduction of a resin to the mold 22 to mold the part 14 comprising the shaped preform 13 and the resin. After the final part 14 has been cured at a curing temperature determined by the curing requirements of the resin, e.g., defined by the properties of the molding resin, the cured part 14, in its ultimate or cured shape, is removed from the mold 22.

FIG. 4A shows another alternate configuration of an unbound preform 40, where the unbound preform 40 is formed by spraying the material 18 on a predominantly flat preform tool 38 including irregular preform tool portions 38a, 38b, 38c and 38d, to form a predominantly flat surface consisting of generally or substantially flat areas or portions 11, and irregular areas or portions 40a, 40b, 40c, and 40d, which, as shown in the non-limiting example of FIG. 4A, may be of irregular or non-uniform height, thickness, or area. The preform material 18 may be uniformly or non-uniformly sprayed onto the surface of preform tool 38, such that the irregular portions 40a, 40b, 40c, 40d may be of non-uniform height, width, area, density or orientation, as compared with other portions of the unbound preform 40. Accordingly, the irregular portions 40a, 40b, 40c, 40d may be defined by the profile, features or irregular portions 38a, 38b, 38c, 38d of preform tool 38, by irregular or non-uniform spraying of the material 18, or by a combination thereof. The unbound preform 40 defines the shape of the bound preform 42 and the corresponding irregular portions 42a, 42b, 42c and 42d shown in FIG. 4B.

The bound preform 42, as discussed previously, is converted by heating the unbound preform 40 above the transformation temperature of the SMP binder 16, to bind the preform material 18 such that the unbound preform 40 is converted to the bound preform 42 in its permanent shape. As shown in FIG. 4B, the irregular portions 42a, 42b, 42c, 42d may be non-uniform with respect to each other, e.g., irregular portion 42a may have a greater height $x_a$ and width $y_a$ than irregular portion 42d, where irregular portion 42d is defined by a height $x_d$ and width $y_d$, in a non-limiting example. As another example, the irregular portion 42b may have a thicker cross-section $z_b$ than irregular portion 42c, where irregular portion 42c is defined by a cross-section $z_c$.

Each irregular portion may vary from another irregular portion and may vary from the substantially flat portions 11 of the bound preform 42 in any characteristics which can be varied by varying the spraying pattern used to form the unbound preform 40 and/or the profile of the preform tool 38, including but not limited to thickness, area, density, height and orientation of the material 18. As shown in FIG. 4B, the predominantly flat surface of the bound preform 42 in the permanent shape is defined by a plurality of substantially flat portions 11, and is characterized by the ability to be transported readily by positioning the bound preform 42 on the plurality of substantially flat portions 11 on a pallet, rack, conveyor or other generally flat surface. The simplified geometry of the bound preform 42 in its permanent shape, as compared to, for example, the shaped preform 13 in the temporary shape, facilitates ease of insertion of the bound preform 42 into the mold 22, as shown in FIG. 4C.

Figure 4C:
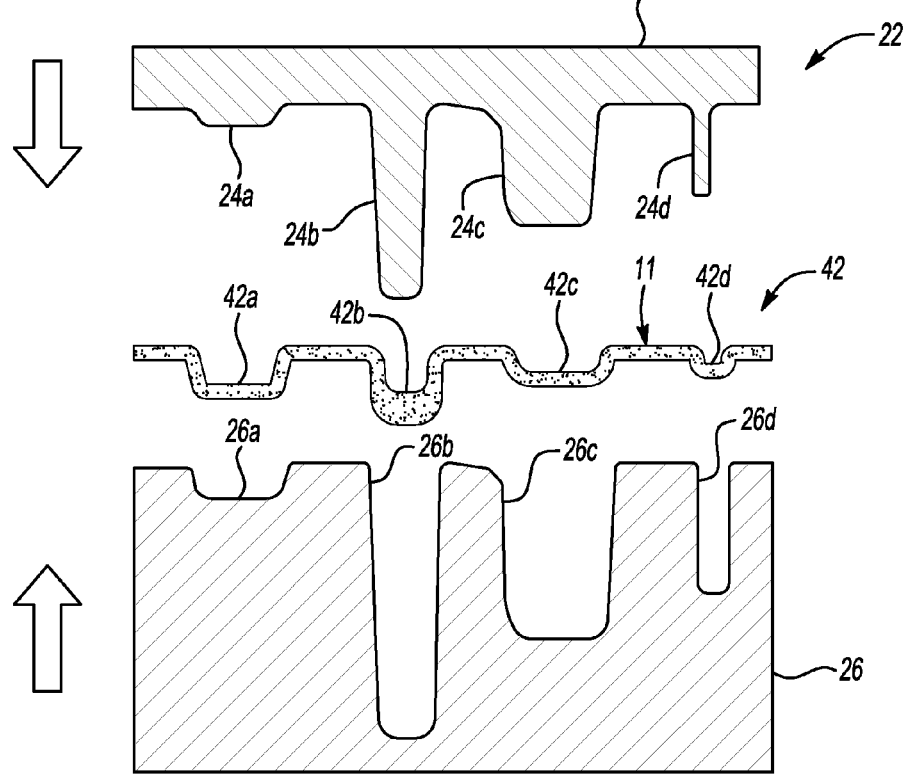
FIG. 4C is a schematic cross-sectional illustration of the mold of FIG. 2A in an open position, and the bound preform of FIG. 4B.

One or more of the irregular portions 42a, 42b, 42c, 42d may correspond to a portion of the mold 22, as shown in the non-limiting example of FIG. 4C. For example, the bound preform 42 in the permanent shape may be inserted into the mold 22 as shown in FIG. 4C, such that the irregular portion 42a corresponds with the mold portions 24a and 26a, the irregular portion 42b corresponds respectively with the mold portions 24b and 26b, the irregular portion 42c corresponds respectively with the mold portions 24c and 26c, and the irregular portion 42d corresponds respectively with the mold portions 24d and 26d.

When the bound preform 42 is heated above the transformation temperature of the SMP binder 16 such that the SMP binder 16 comprising the preform becomes easily deformable, and the mold 22 is closed or otherwise configured to exert pressure on the bound preform 42, the bound preform 42 is deformed to conform to the cavity of the mold 22, and the irregular portions 42a, 42b, 42c, 42d of the bound preform 42 are selectively contacted, pressurized or deformed by the corresponding mold portions of the mold elements 24 and 26, to form the intricate features 13a, 13b, 13c and 13d of the shaped preform 13.

By providing the irregular portions, the formability of the intricate features of the shaped preform 13 and the resultant final part 14 may be enhanced. For example, the irregular portion 42b may provide additional material 18, when heated above the transformation temperature of the SMP binder 16 and extruded by the mold portion 24b into the mold portion 26b, to ensure sufficient material is available during the drawing process to form the intricate feature 13b (see FIG. 2C). As another example, the simplified profile of feature 13b represented by the irregular portion 42b may reduce the magnitude of distortion or deformation required to achieve the fully extruded deep draw profile of the intricate feature 13b.

Following transformation of the bound preform 42 to the temporary shape of the shaped preform 13 shown in FIG. 2C, the molding and curing process continues as discussed previously for FIGS. 2C and 2D, with, for example, the introduction of a resin to the mold 22 and to the shaped preform 13 in its temporary shape shown in FIG. 2C, to mold and cure the part 14 in its ultimate shape. The part 14 comprising the shaped preform 13 in the temporary shape is cured at a curing temperature suitable to cure the resin, and the cured part 14 is removed from the mold 22. The final or ultimate shape of the cured part 14 defines or is configured substantially the same as the shape of the shaped preform 13 and the temporary shape of the SMP binder 16 comprised therein.

Figure 4D:
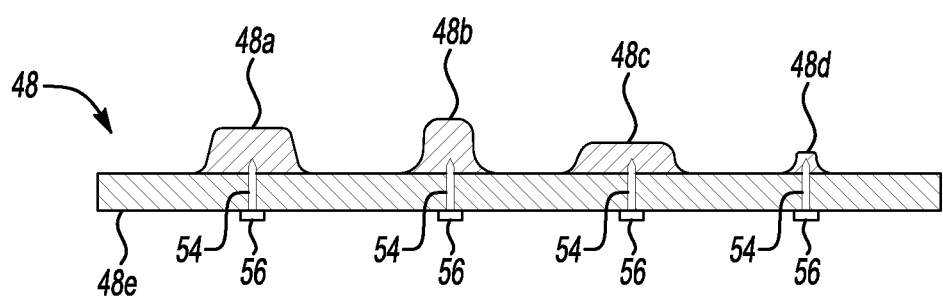
FIG. 4D is a schematic cross-sectional illustration of another configuration of the preform tool of FIG. 4A.

The preform tool 48 shown in FIG. 4D provides an alternate configuration of the preform tool 38. The preform tool 48 comprises inserts or preform tool portions 48a, 48b, 48c, 48d which are configured to be operatively attached to a universal, e.g., substantially flat portion 48e to define a preform tool 48 with a profile, in the non-limiting example shown, substantially equivalent to the profile of the preform tool 38 (see FIG. 4A). The preform tool portions 48a, 48b, 48c, 48d may be operatively attached to the substantially flat portion 48e by any suitable means, for example, tool portions 48a, 48b, 48c, 48d may be inserts which are configured with dowels, clips, pegs, threaded posts, etc. for insertion into holes, slots or other openings 54 in flat portion 48e, or which may be drilled and tapped such that they may be operatively attached, by way of non-limiting example, using fasteners 56 as shown in FIG. 4D.

The substantially flat portion 48e may include holes and/or slots 54 or other features which are configured such that the various tool portions corresponding to a variety of different part configurations may be operatively attached to the portion 48e to provide a variety of different preform tools using the standardized or universal flat portion 48e and a combination of tool inserts. The attachment features 54 may be blocked off or otherwise modified when not in use to provide a generally flat surface area on the flat portion 48e. Because the preform tool configuration shown in FIG. 4D can be adapted, by varying the configuration and placement of the tool portion inserts on the universal portion 48e to provide multiple preform tool assemblies each configured to produce a preform of a varying part configuration, a variety of preform tools may be provided at substantially lower costs using the universal portion and interchangeable inserts, resulting in decreased lead or set-up time, decreased costs and additional process flexibility, as compared with dedicated tooling configured to each part configuration.

The unbound preform 10 defining the shape of the bound preform 12 may be formed in various configurations characterized by a simplified geometry, such as flat sheets, or with irregular portions such as those illustrated by the non-limiting examples of preforms 32, 42 shown in FIGS. 3B, 4B respectively. By providing a bound preform in a permanent shape which may be converted to a shaped preform in a temporary shape defined by the mold of the ultimate part, a single, e.g., universal or generic configuration of a bound preform in its permanent shape can be used to form each of a multitude of differently configured parts. Further, the capability to configure the unbound preform, and thereby, to configure the bound preform, with irregular portions which individually may represent a simplified geometry of the part feature to which the irregular portions correspond enables the ability to preferentially provide additional material to portions of the preform which will be used to form intricate features including, for example, deeply drawn ribs, where additional material may be required to ensure sufficient as-molded thickness in the ultimate part.

Similarly, the bound preform may be configured to provide sections or areas which are thinned or configured to selectively distribute the preform material to ensure formability of thinner or finely defined areas or features of the shaped preform and the resultant cured part. Configuring the preform with irregular portions which are configured in an interim shape compared to the part feature to which the irregular portion corresponds, for example, as a partially formed rib, enables the ability to reduce the magnitude or severity of deformation required during the molding process to convert the SMP bound preform to a shaped preform in a temporary shape and to form the cured part.

While the best modes for carrying out the invention have been described in detail, those familiar with the art to which this invention relates will recognize various alternative designs and embodiments for practicing the invention within the scope of the appended claims.

The invention claimed is:

1. A method of molding a composite part characterized by a final part shape, the method comprising:
   positioning a bound preform including a shape memory polymer (SMP) binder and generally configured in a simplified geometry defined by a permanent shape of the SMP binder in a part mold that defines the final part shape;
   heating the bound preform above a transformation temperature of the SMP binder such that the bound preform is formable by the part mold;
   deforming the bound preform above a transformation temperature into a shaped preform defined by a temporary shape of the SMP binder, using the part mold;
   applying a resin to the shaped preform in the part mold; and
   curing the resin in the part mold to produce a part configured in the final part shape and including the cured resin and the shaped preform.

2. The method of claim 1, wherein providing the bound preform generally configured in the simplified geometry defined by the permanent shape of the SMP binder to the part mold further comprises:
   spraying a material including the SMP binder to provide an unbound preform generally configured as a mat;
   heating the unbound preform above a binding temperature defined by the SMP binder; and
   converting the SMP binder to the permanent shape to bind the material, thereby converting the unbound preform into a bound preform, wherein the shape of the bound preform is defined by the shape of the unbound preform.

3. The method of claim 2, wherein the binding temperature is one of a cure temperature of the SMP binder and a melting temperature of the SMP binder.

4. The method of claim 2, wherein the material further comprises a fiber, the fiber including one or more of a glass fiber, a carbon fiber, a metallic fiber, a polymer fiber, and a fiber comprising metal alloy wires.

5. The method of claim 2, wherein the material is comprised of less than 10% SMP binder by weight.

6. The method of claim 1, wherein the temporary shape of the SMP binder is defined by the final part shape.

7. The method of claim 1, wherein deforming the bound preform above the transformation temperature into the shaped preform defined by the temporary shape of the SMP binder using the part mold further comprises:
   deforming the bound preform by one or more of stamping, compression and vacuum forming.

8. The method of claim 2, wherein the unbound preform generally configured as a mat further comprises:
   one or more substantially flat portions defined by material of substantially uniform density, uniform thickness and uniform orientation; and
   one or more irregular portions, wherein
      each of the irregular portions corresponds to at least one of a mold portion, a preform tool portion, and a part feature, and
      is defined by at least one of a non-uniform density, a non-uniform thickness, a non-uniform material orientation, and a corresponding preform tool portion.

9. The method of claim 2, wherein spraying a material comprising the SMP binder to provide the unbound preform generally configured as a mat further comprises:
   uniformly spraying the material to provide substantially flat portions of substantially uniform density, thickness and material orientation; and
   selectively spraying the material to provide one or more irregular portions, wherein each irregular portion is defined by at least one of a non-uniform density, a non-uniform thickness and a non-uniform material orientation.

10. The method of claim 9 wherein the irregular portion corresponds to at least one of a portion of the part mold and a feature defined by the final part shape.

11. The method of claim 2, wherein spraying the material comprising the SMP binder to provide the unbound preform generally configured as a mat further comprises:
   providing a preform tool including a tool portion corresponding to at least one of a portion of the part mold and a feature defined by the final part shape;
   spraying the material on the preform tool to provide an unbound preform generally configured as a mat including an irregular portion defined by the tool portion.

12. The method of claim 11, wherein spraying the material on the tool portion of the preform tool includes selectively spraying the material on the tool portion such that the irregular portion is defined by at least one of a non-uniform density and a non-uniform thickness.

13. The method of claim 11, wherein the tool portion is an insert configured to be operatively attached to the preform tool.

14. A molding method using a shape memory polymer (SMP), the method comprising:
- providing a bound preform including a SMP binder in a permanent shape and defining a predominantly flat surface;
- inserting the bound preform into a mold, wherein the mold is configured to define a final part shape;
- heating the bound preform above a transformation temperature of the SMP binder;
- deforming the bound preform into a shaped preform defined by the SMP binder in a temporary shape, using the mold;
- providing a resin to the shaped preform in the mold;
- curing the part in the mold to produce a part including the shaped preform and defined by the final part shape.

15. The method of claim 14, deforming the bound preform into the shaped preform defined by the SMP binder in the temporary shape using the mold further comprises:
- applying pressure to shape the SMP binder into the temporary shape using at least one of compression, stamping and vacuum forming.

16. The method of claim 14, wherein the final part shape is defined by at least one intricate feature.

17. The method of claim 1, wherein the bound preform is generally configured as one of a sheet, a panel and a mat.

18. The method of claim 14, wherein providing the bound preform comprising the SMP binder in the permanent shape further comprises:
- spraying a material including the SMP binder to form an unbound preform defining the predominantly flat surface;
- heating the unbound preform above a binding temperature; and
- converting the SMP binder to the permanent shape to produce the bound preform, wherein the shape of the bound preform is defined by the shape of the unbound preform.

19. The method of claim 18, wherein the unbound preform defining the predominantly flat surface further comprises:
- one or more substantially flat portions comprised of material defined by one of substantially uniform density, substantially uniform thickness and substantially uniform orientation; and
- one or more irregular portions, wherein
  - each of the irregular portions corresponds to one of a mold portion, a preform tool portion, and a part feature, and
  - is defined by one of a non-uniform density, a non-uniform thickness, a non-uniform material orientation, and a corresponding preform tool portion.

20. The method of claim 18,
- wherein the material comprises a fiber, the fiber including one or more of a glass fiber, a carbon fiber, a metallic fiber, a polymer fiber, and a fiber comprising metal alloy wires; and
- wherein the material is comprised of less than 10% SMP binder by weight.

* * * * *